J. F. COURSON.
DRAFT GEAR.
APPLICATION FILED JUNE 14, 1912.
1,076,749. Patented Oct. 28, 1913.
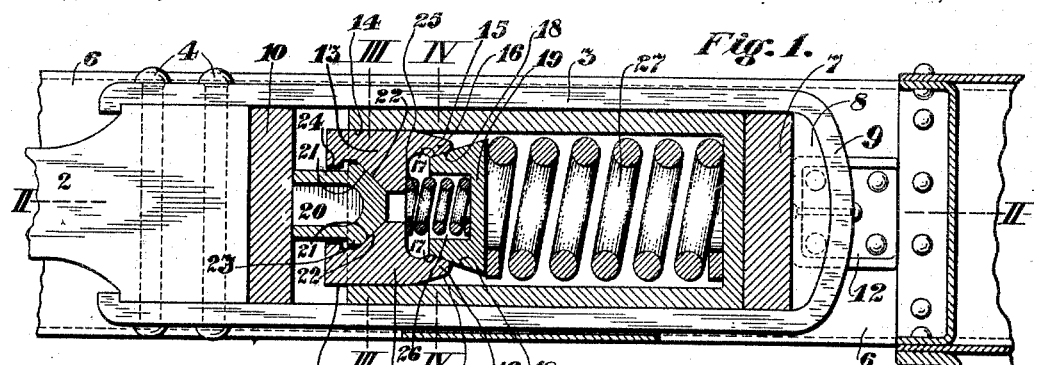
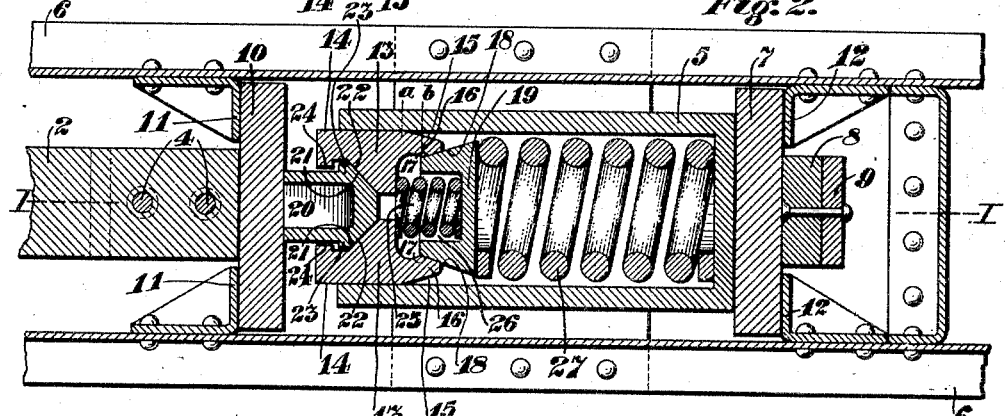
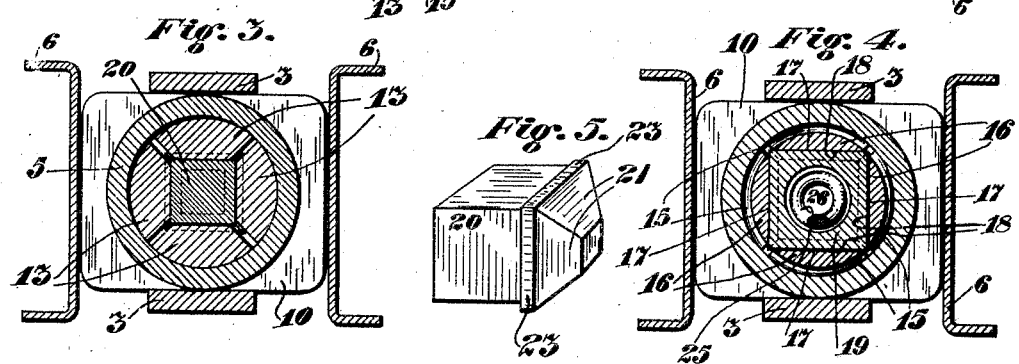
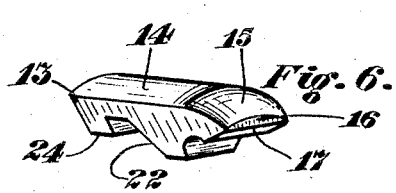
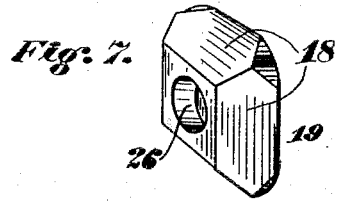
Witnesses:
Ivas Heckman
Fredk Staub
Inventor:
John F. Courson
by C. M. Clark
his attorney

UNITED STATES PATENT OFFICE.

JOHN F. COURSON, OF PITCAIRN, PENNSYLVANIA.

DRAFT-GEAR.

1,076,749.  Specification of Letters Patent.  Patented Oct. 28, 1913.

Application filed June 14, 1912. Serial No. 703,719.

*To all whom it may concern:*

Be it known that I, JOHN F. COURSON, a citizen of the United States, residing at Pitcairn, in the county of Allegheny and State of Pennsylvania, have invented certain new and useful Improvements in Draft-Gears, of which the following is a specification.

My invention consists of an improvement in friction draft gears for railway cars, etc., and it has for its object to provide a draft gear of simple construction and high efficiency, designed to utilize the wedging and releasing qualities of friction-creating wedge blocks between a central buffing member and a surrounding casing, in combination with an endmost co-acting wedge block and spring so arranged to coöperate with the said elements, as shall be more fully hereinafter described.

The particular object of the invention is to provide, in a friction draft gear of this type, means for separating an assembled series of friction-creating blocks by the wedging action of a central wedge block of a sufficiently blunt formation to readily release upon release of pressure, in combination with an opposing wedge block, preferably spring retarded, engaging the inner terminals of said friction-creating wedge blocks, in such a manner as to exert a high degree of lateral pressure therein, and so arranged with relation to said friction-creating wedge blocks, that they will readily collapse and release upon release of pressure, with the assistance of an interposed spring member, if desired.

These objects are accomplished by the construction illustrated in the accompanying drawings, showing one preferred form of the invention, in which—

Figure 1 is a central vertical sectional view of the complete draft gear assembled, the parts being in extended position, indicated by the line I. I. of Fig. 2. Fig. 2 is a horizontal sectional view indicated by the line II. II. of Fig. 1. Figs. 3 and 4 are transverse sectional views on the lines III. III. and IV. IV., respectively, of Fig. 1.

Fig. 5 is a detail view in perspective of the centrally arranged buffing wedge block. Fig. 6 is a similar view of one of the segmental shaped friction creating wedge blocks. Fig. 7 is a similar view of the terminal wedge block.

In the drawings, 2 represents the drawbar of the coupler fixedly connected with the yoke 3 by transverse rivets 4 in the manner customary in this art, said yoke embracing the casing and cylinder 5 at top and bottom, as shown, the yoke and casing being located between the usual draft sills 6, 6, of the car framing.

The numerals 7 and 8 designate a follower plate and filling block, respectively, set against the rear end of casing 5 and against the outer end of block 8, against which bears the rounded end 9 of the strap 3, the filling block being preferably secured to the end of the strap by a rivet, as indicated. The numeral 10 designates a follower plate like plate 7. Each of these follower plates extends out laterally at each side of the yoke 3 and bears against the usual front and back stops 11 and 12 of any suitable construction, secured to the center sills, and which provide against pulling and buffing strains, respectively, as is well understood.

Assembled within the front portion of casing 5 is a plurality of segmental shaped friction-creating wedge blocks 13, the outer faces 14 of which are cylindrical, the outer rearmost portion of said blocks tapering inwardly, as indicated at 15, providing inwardly extending supporting terminals 16 having inner inclined wedging faces 17. Faces 17 are sufficiently acute with relation to the longitudinal center of the gear to effect a high degree of outward pressure by their action against faces 18 of the centrally disposed similar acute wedge block 19, or vice versa.

A forward central wedge block 20 having blunt wedge faces 21 is interposed between the forward follower 10 and the series of friction-creating wedge blocks 13 and engages by its faces 21, similar blunt inner wedge faces 22 of said blocks, whereby to effect lateral separation thereof to a limited extent, with resulting free release.

Wedge block 20 is provided with laterally extending lips or flanges 23 adapted to engage inwardly against co-acting lips or flanges 24 of the friction-creating wedge blocks 13, with sufficient clearance for slight longitudinal play therein, whereby to maintain the several parts in assembled position.

Interposed between the inner acute wedge block 19 and wedge blocks 13, is a spring 25, preferably seated in a recess or pocket 26 in block 19, bearing by its other end against the rear faces of blocks 13, as clearly shown. Said spring may be used or not as desired.

It will be observed that the acute angle inclined faces 17 extend inwardly of the rear tapered portions 16 of the blocks 13, a distance somewhat less than the length of the outer taper 15, whereby to provide, between said outer tapered portions and the inner face of the casing 5, ample clearance, and also to insure termination of the frictional faces 14 at a point somewhat in advance of or beyond the inner terminals of faces 17. This difference approximates the longitudinal difference between the locations $a$ and $b$, Fig. 2, and is of advantage in facilitating collapsing of the friction-creating wedge blocks 13 upon release of pressure of the faces 21 of the central wedge block 20 from the inner faces 22.

Interposed between the inner rear end of casing 5 and the back face of block 19 is a pressure spring 27 adapted, when the gear is compressed, to force acute angle block 19 between faces 17 of the friction creating wedge blocks 13 in pulling, or to maintain block 19 against the inward travel of said blocks, in buffing.

The operation is as follows: In either buffing or pulling, the pressure exerted between the central wedge block 20 and blocks 13 effects a partial separation of the blocks, bringing them into intimate contact with the inner face of the casing, within the limitations of the blunt angles 21, 22. The blocks 13 having been set against the casing with frictional engagement as limited by the separating efficiency of blunt angles 21, 22, said blocks and block 20 will then travel together in buffing, or will remain inert with relation to the casing 5, in pulling. Co-action of acute angle faces 17 and 18 then effects a powerful additional separation of the blocks 13 and a resulting corresponding increase of frictional resistance between faces 14 and the interior of the casing, in proportion to the pressure exerted by the wedge block 20, or the resistance thereof. Thus, at the commencement of the operation, the blocks 13 will be set out against the interior of the casing and will bind thereagainst with increased friction, in addition to the resistance of spring 27, depending upon the spreading action of the acute angle wedge 18. Upon release of pressure and separation of the blunt angle wedge block 20 from the blunt angle faces 22, blocks 13 will collapse, due to release of binding engagement, assisted by the clearance effected by the termination of the friction faces 14 in front of the inner termination of the friction faces 17. In other words the blocks 13, due to their mounting by their inner ends on blocks 18, operate somewhat in the manner of levers, the action being assisted by the spreading effect of spring 25.

Having described my invention, what I claim is:

1. In a friction draft gear, the combination of a casing, a relatively movable drawbar, friction-creating wedge blocks having friction faces engaging the casing, a buffing block interposed between the drawbar and said wedge blocks, and a wedge block interposed between the inner end of the casing and said wedge blocks longitudinally beyond the termination of its friction faces.

2. In a friction draft gear, the combination of a casing, a relatively movable drawbar, friction-creating wedge blocks having outer friction faces engaging the casing, inner blunt angle faces at their outer ends, and inner acute angle faces at their opposite ends longitudinally beyond the outer friction faces, a buffing block engaging the blunt angle faces of said wedge blocks and opposing the drawbar, a wedge block engaging the acute angle faces thereof, and a spring interposed between said last named wedge block and the friction-creating wedge blocks, substantially as set forth.

3. In a friction draft gear, the combination of a casing, a relatively movable drawbar, friction-creating wedge blocks engaging the casing having sets of front and rear inner opposed wedge faces and front inwardly extending retaining lips, a buffing block interposed between the drawbar and said wedge blocks and having co-acting retaining lips, a wedge block interposed between the rear wedge faces, and a spring between said wedge block and the inner end of the casing, substantially as set forth.

4. In a friction draft gear, the combination of a casing, a relatively movable drawbar, friction-creating wedge blocks having friction faces engaging the casing and rear inwardly disposed portions having inner acute angle wedge faces and front inner blunt angle faces, a buffing block opposing the drawbar and engaging the blunt angle faces, and an acute angle wedge block interposed between and engaging the acute angle faces of the friction-creating wedge blocks, substantially as set forth.

5. In a friction draft gear, the combination of a casing, a relatively movable drawbar, friction-creating wedge blocks having friction faces engaging the casing, front inner blunt angle faces and rear inwardly disposed portions having inner acute angle wedge faces, a buffing block opposing the drawbar and engaging the blunt angle faces, an acute angle wedge block interposed between and engaging the acute angle faces of the friction-creating wedge blocks, and a spring engaging said acute angle wedge block and the rear ends of the friction-creating wedge blocks, substantially as set forth.

In testimony whereof I hereunto affix my signature in the presence of two witnesses.

JOHN F. COURSON.

Witnesses:
C. M. CLARKE,
W. A. HECKMAN.